(12) United States Patent
Ishiyama

(10) Patent No.: US 7,239,590 B2
(45) Date of Patent: Jul. 3, 2007

(54) WRITE POWER CONTROL METHOD, WRITE POWER CONTROL APPARATUS AND INFORMATION RECORDING APPARATUS HAVING THE SAME

(75) Inventor: Yoshiyuki Ishiyama, Kanagawa (JP)

(73) Assignee: Ricoh Company, Ltd. (JP)

( * ) Notice: Subject to any disclaimer, the term of this patent is extended or adjusted under 35 U.S.C. 154(b) by 553 days.

(21) Appl. No.: 10/654,936

(22) Filed: Sep. 5, 2003

(65) Prior Publication Data

US 2004/0052179 A1    Mar. 18, 2004

(30) Foreign Application Priority Data

Sep. 17, 2002    (JP) .............................. 2002-270823

(51) Int. Cl.
*G11B 7/00*    (2006.01)

(52) U.S. Cl. ................................. 369/59.11; 369/47.53

(58) Field of Classification Search ..................... None
See application file for complete search history.

(56) References Cited

U.S. PATENT DOCUMENTS 5,956,313 A * 9/1999 Maegawa et al. ........ 369/53.26

7,019,273 B2 * 3/2006 Yokoi ....................... 250/201.5
2002/0191506 A1   12/2002 Okamoto et al.

FOREIGN PATENT DOCUMENTS

JP    2000-30276    1/2000

* cited by examiner

*Primary Examiner*—Wayne Young
*Assistant Examiner*—Joseph Haley
(74) *Attorney, Agent, or Firm*—Dickstein Shapiro LLP

(57) ABSTRACT

A write power control method of controlling a recording pulse of a laser diode. The method including the steps of: setting, to a target value, a measured value corresponding to an optimum write power determined in an optimum write power determining process performed before recording information; comparing the target value with an output level measured in power control; and controlling an erase power to approach the target value based on a result of the comparison. The recording pulse is a multi-pulse defined by a peak power, the erase power, and a bottom power; and the erase power, at a time when the multi-pulse is not being output, is used in the step of controlling the erase power.

3 Claims, 7 Drawing Sheets

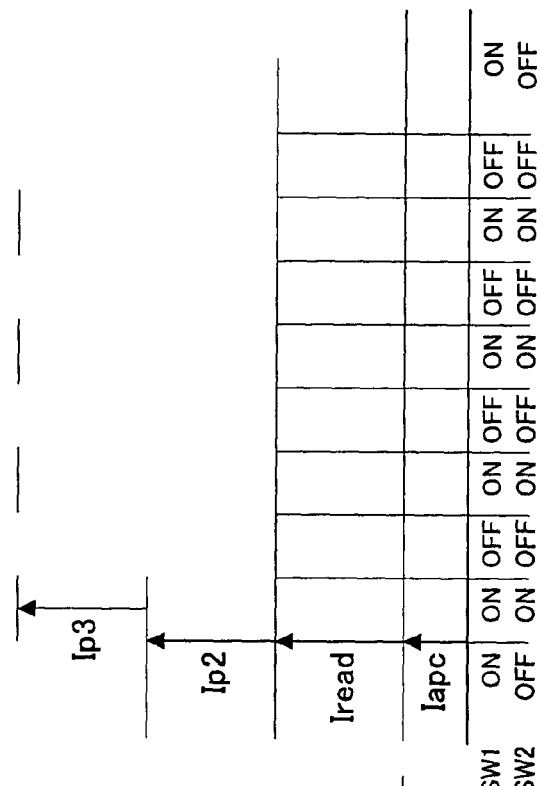
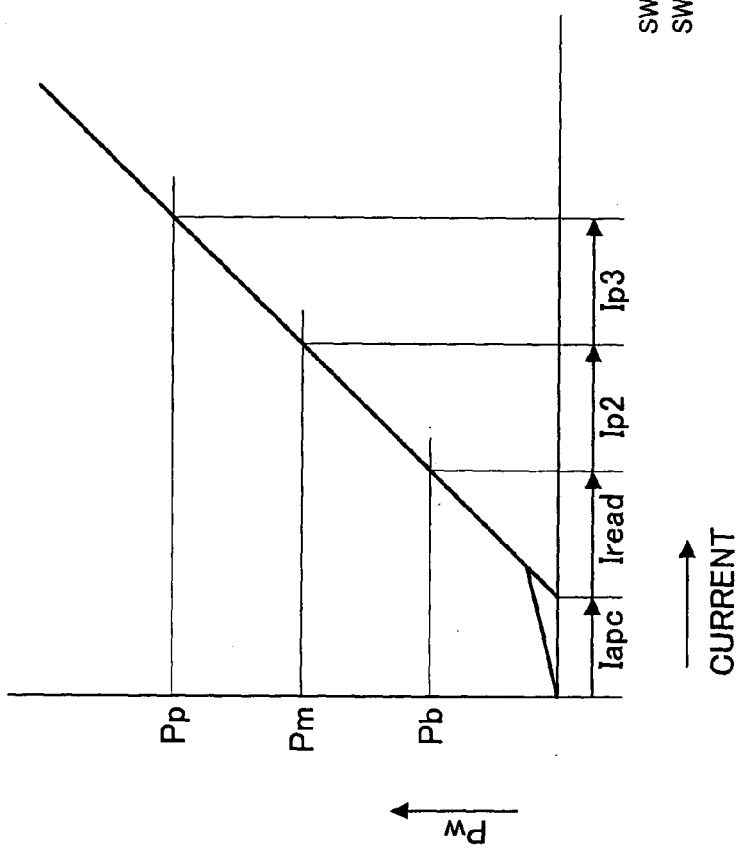
FIG.2B
FIG.2A

WRITE POWER CONTROL METHOD, WRITE POWER CONTROL APPARATUS AND INFORMATION RECORDING APPARATUS HAVING THE SAME

BACKGROUND OF THE INVENTION

1. Field of the Invention

The present invention relates to write power control methods and write power control apparatuses in drive technologies that record information on optical disks such as CD-Rs, CD-RWs, DVD+RWs, and DVD+Rs.

2. Description of the Related Art

Information is recorded on recordable (write once) and rewritable optical disks by applying thereon a dye-based phase change recording material, for example, forming recording marks by irradiating a laser beam while following a groove, and irradiating the laser beam of an erase power so as to erase the recording marks that are previously recorded. In order to stably form recording marks and recording spaces on an optical disk under a certain condition, it is necessary to control the drive current of a LD (laser diode) so that constant laser power is always obtained in accordance with information.

Regarding improving the methods, power control methods in optical disk recording include a method of holding each of peak and bottom values of an optical output pulse, calculating a recording base value based on the held peak and bottom values and the level ratio of the recording base value with respect to predetermined peak and bottom values, and controlling the optical output pulse such that the peak value, bottom value, and recording base value approach respective target values (for example, refer to Japanese Laid-Open Patent Application No. 2000-30276).

Although the method described above is effective for a single pulse waveform, the method cannot be applied to a multi-pulse waveform. The recording waveform of a laser beam is a multi-pulse waveform of which signal level, having a peak power, an erase power, and a bottom power, is defined by a predetermined switching timing so that best recording quality is achieved. However, with conventional methods it has been impossible to control a multi-pulse to maintain optimum write power since it is difficult to measure a multi-pulse.

SUMMARY OF THE INVENTION

Accordingly, it is a general object of the present invention to provide an improved and useful write power control method, write power control apparatus, and information recording apparatus having the write power control apparatus in which the above-mentioned problems are eliminated.

It is another and more specific object of the present invention to provide a write power control method, a write power control apparatus, and an information recording apparatus having the write power control apparatus that can obtain the optimum write power in a multi-pulse.

In order to achieve the above-mentioned objects, according to one aspect of the present invention, there is provided a write power control method of controlling a recording pulse of a laser diode, including the steps of:

setting, to a target value, a measured value corresponding to an optimum write power determined in an optimum write power determining process performed before recording information;

comparing the target value with an output level measured in power control; and controlling an erase power to approach the target value based on a result of the comparison, wherein the recording pulse is a multi-pulse defined by a peak power, the erase power, and a bottom power; and the erase power, at a time when the multi-pulse is not being output, is used in the step of controlling the erase power.

According to the present invention, during emission of a multi-pulse before recording, the average signal level of the multi-pulse, corresponding to the optimum write power in the OPC, is measured. The OPC is performed by using predetermined switching timing and the ratio between an amount added to the bottom power to obtain the erase power and an amount added to the erase power to obtain the peak power. The switching timing is determined in advance so as to obtain the best signal levels of the peak power and bottom power and the best recording quality. The measured signal level is set to the target value. The target value is compared with an output level measured during emission of the multi-pulse while recording information, so as to correct the signal levels of the peak power and bottom power.

Additionally, with the write power control method, when the average value obtained based on the ratio determined by the peak power, the bottom power, and a predetermined strategy is close to the erase power, the ratio of the multi-pulse in sampling the average value may be varied.

The value added to the bottom power to obtain the erase power is defined by dividing the difference between the erase power and the average value by the coefficient determined by the strategy, the bottom power, and the ratio between the value added to the erase power to obtain the peak power and the value added to the bottom power to obtain the erase power. When the above-described coefficient is "0", that is, when the average value calculated by using the ratio determined by the peak power, the bottom power, and the strategy is close to the erase power, it is impossible to define a value added to the bottom power to obtain the erase power by using the difference. The present invention aims to perform correction even if such a singular solution is obtained. When the average value obtained by calculation using the ratio that is determined by the peak power, the bottom power, and the strategy is close to the erase power, correction is performed by varying the ratio to a predetermined ratio with which the coefficient does not become "0" at the timing of sampling an average value during emission of the multi-pulse.

In addition, with the write power control method, when the erase power falls within a permissible range with respect to the target value in the step of controlling the erase power, in a case where an average value measured in recording information is greater than the target value measured in the OPC, it is possible to perform correction of increasing first and second additional values, and in a case where the average value is smaller than the target value, it is possible to decrease the first and second additional values, the first additional value being added to the erase power to obtain the peak power, and the second additional value being added to the bottom power to obtain the erase power.

The average value in emission of the multi-pulse is defined by the difference from the erase power. In the present invention, even if the erase power is varied in order to stabilize the control system, correction is not performed in a transitional state where the erase power is being controlled to be the target value during erase power control. The correction is performed when the control of the erase power reaches a steady state.

Further, with the write power control method, an amount added to the bottom power to obtain the erase power, at a time when the difference between the target value measured in the OPC and the average value measured in recording information falls within a permissible range, is maintained, the efficiency (differential efficiency) of power to a current supplied to the laser diode is obtained, and the efficiency is set to an initial value in setting write power for the next time.

The present invention aims to quickly output the set recording power even if the differential efficiency of the laser diode varies due to environmental change. The differential efficiency of a laser diode is calculated and maintained from a value added to the bottom power to obtain the erase power in a steady state where transitional variation in the correction operation does not occur, and the target emission power of the bottom power and erase power. Based on thus obtained differential efficiency, the initial value of the next following recording power setting is calculated.

In addition, according to another aspect of the present invention, there is provided a write power control apparatus including:

a target value setting part setting, to a target value, a measured value corresponding to an optimum write power in OPC performed before recording information;

a comparing part comparing the target value with an output level measured in power control; and a control part controlling the erase power to be close to the target value, wherein the recording pulse is a multi-pulse defined by a peak power, the erase power, and a bottom power; and the erase power, at a time when the multi-pulse is not being output, is used in controlling the erase power.

Also, according to another aspect of the present invention, there is provided an information recording apparatus including the above-described write power control apparatus.

According to the above-mentioned aspects of the present invention, during emission of a multi-pulse before recording, an average signal level of the multi-pulse, corresponding to the optimum write power in the OPC, is measured. The OPC is performed by using predetermined switching timing and the ratio between an amount added to the bottom power to obtain the erase power and an amount added to the erase power to obtain the peak power. The switching timing is determined in advance so as to obtain the best signal levels of the peak power and bottom power and the best recording quality. The measured signal level is set to the target value. The target value is compared with an output level measured during emission of the multi-pulse while recording information, so as to correct the signal levels of the peak power and bottom power.

Additionally, according to the present invention, when recording is performed under the condition that the erase power in recording spaces is controlled, it is possible to correct the peak power with respect to the bottom power to equal the optimum write power.

In addition, according to the present invention, even if the ratio becomes a singular solution, it is possible to set the peak power, erase power and bottom power to the set values.

Further, according to the present invention, it is possible to stabilize the system since transitional variation in controlling of the erase power is not responded to.

Additionally, according to the invention, it is always possible to obtain the newest (most recent) efficiency with respect to a differential efficiency that varies in accordance with environmental change. Hence, it is possible to shorten the convergence time from recording power setting.

Other objects, features and advantages of the present invention will become more apparent from the following detailed description when read in conjunction with the following drawings.

BRIEF DESCRIPTION OF THE DRAWINGS

FIG. 2A is a graph showing an IL (Pw versus I) curve and multi-pulse definition;

FIG. 2B is a graph for explaining ON/OFF control of the switches 10.

DETAILED DESCRIPTION OF THE PREFERRED EMBODIMENTS

A detailed description will now be given of the present invention, with reference to the drawings.

Figure 1:
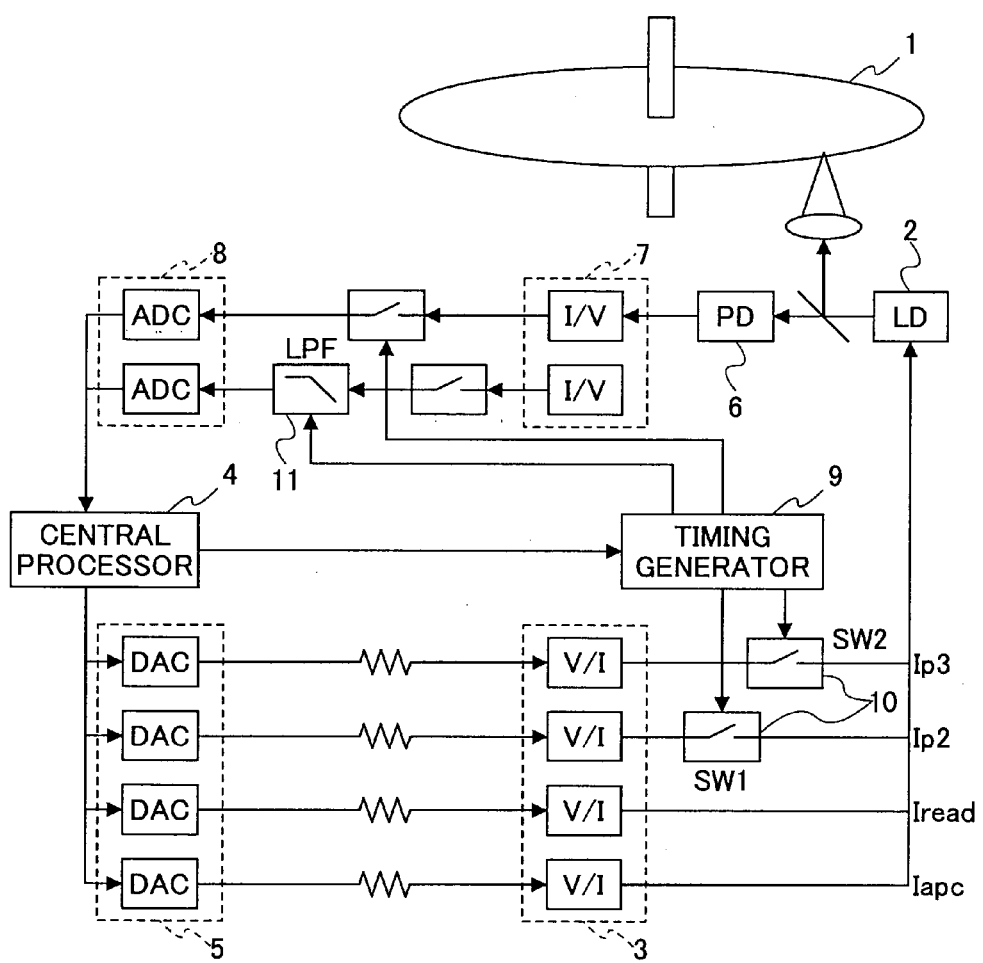
FIG. 1 is a block diagram of a write power control apparatus of an optical disk recording apparatus according to the present invention.

FIG. 1 is a block diagram of a write power control apparatus of an optical disk recording apparatus according to the present invention. Information is recorded on a recordable or rewritable optical disk 1 by applying thereon a dye-based phase change recording material, for example, forming recording marks by irradiating a laser beam from a laser diode (LD) 2 provided on a pick up that moves while following a groove, and irradiating the laser beam at erase power so as to erase previously recorded recording marks. A recording waveform is defined by a bottom power (Pb) that is the read level in writing, an erase power (Pm) that is the erase level, and a peak power (Pp) that is the recording mark generation level. The laser beam of each of the power values is driven by the current obtained by multiplying a current determined by the LD 2 by the efficiency (differential efficiency) of output light.

The drive current is generated through V/I conversion by LD drivers (V/I) 3. Hence, a central processor 4 can increase and decrease the amount of emitted light by controlling the drive voltage applied to the LD drivers 3 via D/A converters (DACs) 5. On this occasion, it is assumed that Iapc is the current applied until the LD 2 becomes luminous, Iread is the current applied after the current Iapc until the laser beam of the bottom power Pb is obtained, Ip2 is the current applied for increasing the level of the laser beam from Pb to Pm, and Ip3 is the current applied for increasing the level of the laser beam from Pm to Pp. FIG. 2A shows an IL (Pw versus I) curve for each signal.

Referring to FIG. 2B, the central processor 4 performs ON/OFF control of switches 10 (SW1 and SW2) by using a timing generator 9 capable of generating a predetermined timing so as to vary the current driving the LD 2, and thereby generating a write pulse.

In addition, a part of a laser beam from the LD 2 is detected by a PD (photo diode) 6 and converted by an I-V converter (I/V) 7. The central processor 4 can obtain the signal after the conversion via an A/D converter (ADC) 8.

Next, a description will now be given of a control operation according to the present invention.

Figure 3:
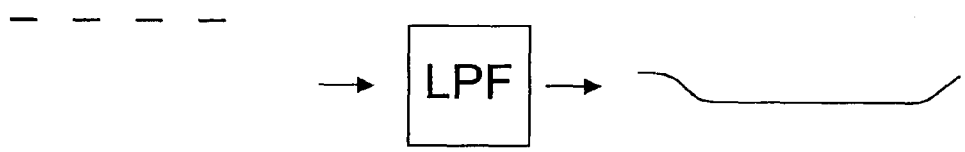
FIG. 3 is a schematic diagram showing an averaged PD signal as a result of passing through a LPF.

The optical disk apparatus according to the present invention includes a control system. The control system records data by using recording marks together with recording spaces and maintains the output level of the erase power in a multi-pulse to be a target value by selectively obtaining a part of the LD 2 output beam for recording spaces. An output from the PD 6 at the time when the multi-pulse for generating a mark having a certain length is emitted, that is, when the laser beam is emitted for forming a recording mark, is converted to an average value. The average value is obtained by removing a frequency component from the output of the PD 6 by causing the output to pass through a low-pass filter (LPF) 11 having a sufficiently low pass band. FIG. 3 is a diagram showing an example of a PD signal that has passed through the LPF.

Figure 4:
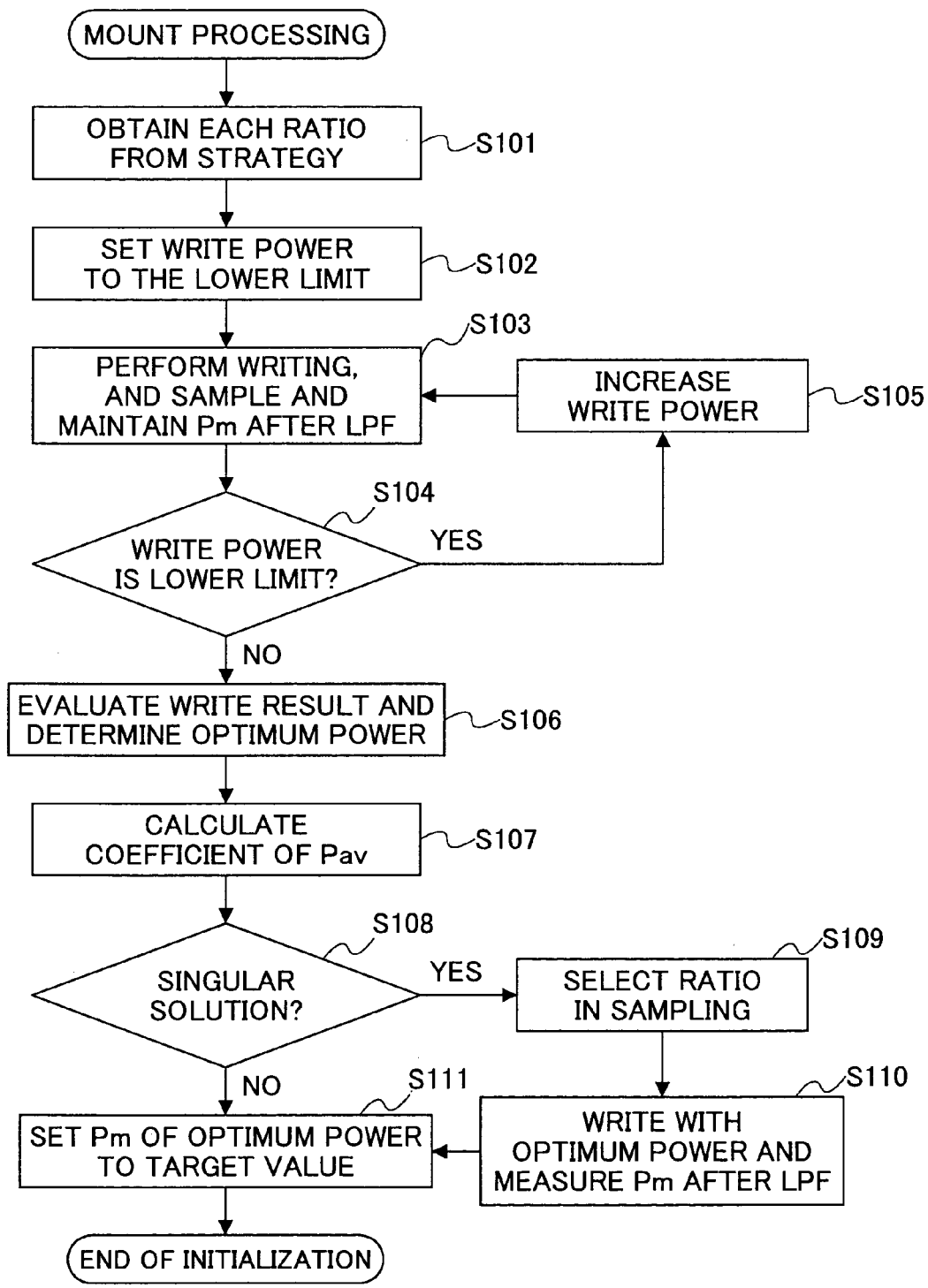
FIG. 4 is a flow chart for explaining an operation flow in mount setting according to the present invention.
Figure 5:
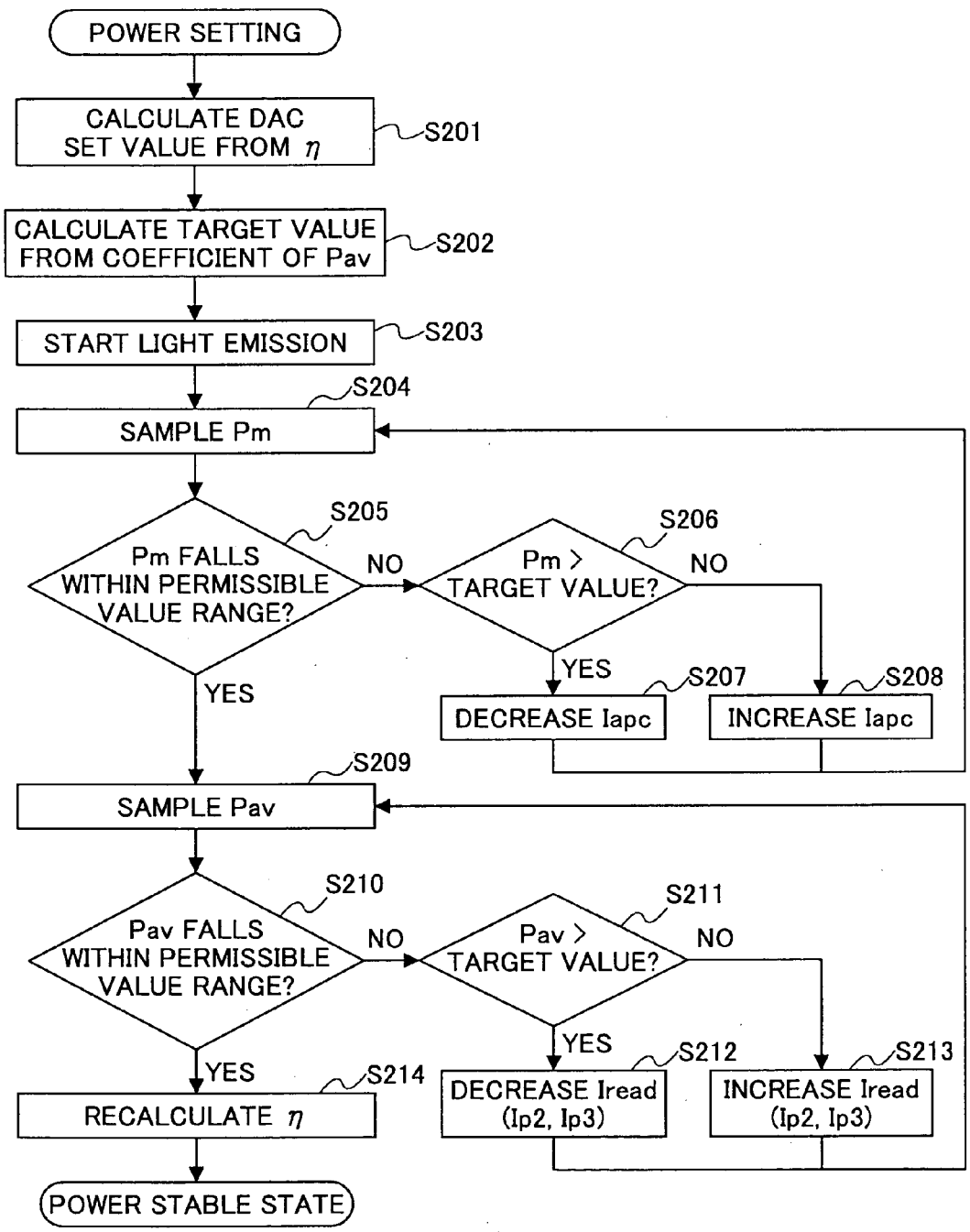
FIG. 5 is a flow chart for explaining an operation flow in power setting according to the present invention.

FIGS. 4 and 5 show operation flows of the present invention.

When a disk is mounted, an optical disk drive determines the manufacturer of the disk from disk information, jitter is determined in advance such that the best jitter is obtained after recording, and a predetermined strategy for generating a light pulse, stored in a memory, is selected. Here, $\alpha$ and $\beta$ are obtained, where $\alpha$ is the ratio of the current Ip2 to the current Ip3 in a multi-pulse for forming a mark having a certain length, and $\beta$ is the timing switching ratio between Pp and Pb in a multi-pulse. The current Ip2 is the current for raising the laser beam emission from Pb to Pm. The current Ip3 is for raising the laser beam emission from Pm to Pp.

In addition, when $\eta$ represents the differential efficiency, the peak power, the erase power, and the bottom power are respectively defined as follows.

$$Pp=\eta(Iread+Ip2+Ip3)+A-\eta Iapc$$

$$Pm=\eta(Iread+Ip2)+A-\eta Iapc$$

$$Pb=\eta(Iread)+A-\eta Iapc$$

It should be noted that "A" is a region where the light is not emitted linearly even if the current represented by the IL curve of the LD 2 is applied.

Here, Iread corresponds to the bottom power, and Ip2 corresponds to the difference between the erase power and the Iread power. Thus, if the differential efficiency $\eta$ is constant and Iapc supplements A, then the ratio ($\gamma$) of the difference between the write powers (pm–pb) to the target value of the read power Pb is equivalent to the ratio of Ip2 to Iread. That is, Ip2=$\gamma$read is obtained from:

$$Pm=\eta(Iread+Ip2)$$

$$Pb=\eta(Iread)$$

$$Pm/Pb=\gamma Pb.$$

Accordingly, the erase power may be redefined as follows.

$$Pm=\eta((\gamma+1)Iread)+A-\eta Iapc$$

In addition, the average value Pav sampled in recording a mark of a certain length is expressed as follows by using $\alpha$, $\beta$, and $\gamma$.

$$Pav=\eta((1+\alpha)\beta\gamma+1)Iread)+A-\eta Iapc$$

Referring to FIG. 4, a detailed description will be given of an operation flow of a mount process according to the present invention.

In step S101, each ratio is obtained from a strategy. In step S102, the write power is set to a lower limit. Then, in step S103, writing is performed and Pm after LPF is sampled and maintained. In step S104, it is determined whether or not Pw is at the lower limit. If the decision result of step S104 is YES, the process proceeds to step S105. In step S105, the write power Pw is increased, and then the process returns to step S103. The process of steps S103, S104, and S105 is repeated until the decision result of step S104 becomes NO.

When the decision result of step S104 is NO, the process proceeds to step S106. In step S106, the write result is evaluated and the optimum Pw is determined. Then, in step S107, the coefficient of Pav is calculated. In step S108, it is determined whether or not a singular solution is obtained. If the decision result in step S108 is YES, then the process proceeds to step S109. In step S109, the ratio in sampling is selected. Then, in step S110, writing is performed with the optimum Pw, and Pm after LPF is measured. Thereafter, the process proceeds to step S111. When the decision result in step S108 is NO, the process also proceeds to step S111. In step S111, Pm of the optimum Pw is set to a target value. In this manner, the initialization ends.

Ip2 and Iread are varied such that an average value Pav sampled at a certain mark length becomes the target value. Here, Iread corresponds to the bottom power, and Ip2 corresponds to the difference between the erase power and the read power. Thus, if the differential efficiency is constant, the ratio ($\gamma$) between the respective target values can be applied. That is, Iread can be determined when Ip2 is determined.

Here, if Ip2=$\gamma$Iread, then $$Pm=\eta((\gamma+1)Iread+Iapc)$$

$$Pav=\eta(((1+\alpha)\beta\gamma+1)Iread+Iapc)$$

are established. In a case where the control of setting Pm as the target value and the control of setting Pav as the target value hold at the same time, it is only a matter of solving the above simultaneous equations with respect to respective target values. However, when $$(\gamma+1)=((1+\alpha)\beta\gamma+1)$$

is satisfied, a solution does not exist. Accordingly, the strategy is temporarily varied only in the sampling, that is, $\alpha$ and $\beta$ that do not satisfy $(1+\alpha)\beta=1$ are selected, so that the simultaneous equations can be solved. The write power is set to the write power determined in the OPC with the above ratios, and writing is performed. Pm on this occasion is measured and set to the target.

The control system performs binary control. Thus, with the condition that the control system for Iapc to Pm is made stable so that a transitional condition of one of them does not affect the other, the control system for Iread to Pav is operated. Pm is varied by varying Iread, which is reflected by Iapc. The condition where both Pm and Pav are made stable is waited for while repeating the above-described operation.

Referring to FIG. 5, a detailed description will be given of an operation flow of power setting according to the present invention.

In step S201, a DAC set value is calculated from $\eta$. In step S202, the target value is calculated from the coefficient of Pav. Then, light emission is started in step S203, and Pm is sampled in step S204. In step S205, it is determined whether or not Pm falls within a permissible value range. When the decision result of step S205 is NO, the process proceeds to step S206. In step S206, it is determined whether or not "Pm>the target value" is satisfied. When the decision result of step S206 is YES, Iapc is decreased in step S207, and the process returns to step S204. On the other hand, when the decision result in step S206 is NO, Iapc is increased, and the process returns to step S204. The process of steps S204 through S208 is repeated until the decision result of step S205 becomes YES.

When the decision result in step S205 is YES, the process proceeds to step S209, where sampling of Pav is performed. Then, in step S210, it is determined whether or not Pav falls within a permissible value range. When the decision result of step S210 is NO, the process proceeds to step S211. In step S211, it is determined whether or not "Pav >the target value" is satisfied. When the decision result in step S211 is YES, Iread (Ip2, Ip3) is decreased in step S212, and the process returns to step S209. On the other hand, when the decision result in step S211 is NO, Iread (Ip2, Ip3) is increased in step S213, and the process returns to step S209. The process of steps S209 through S213 is repeated until the decision result of step S210 becomes YES.

When the decision result of step S210 is YES, then η is recalculated in step S214. In this manner, a stable power state is obtained.

Figure 6:
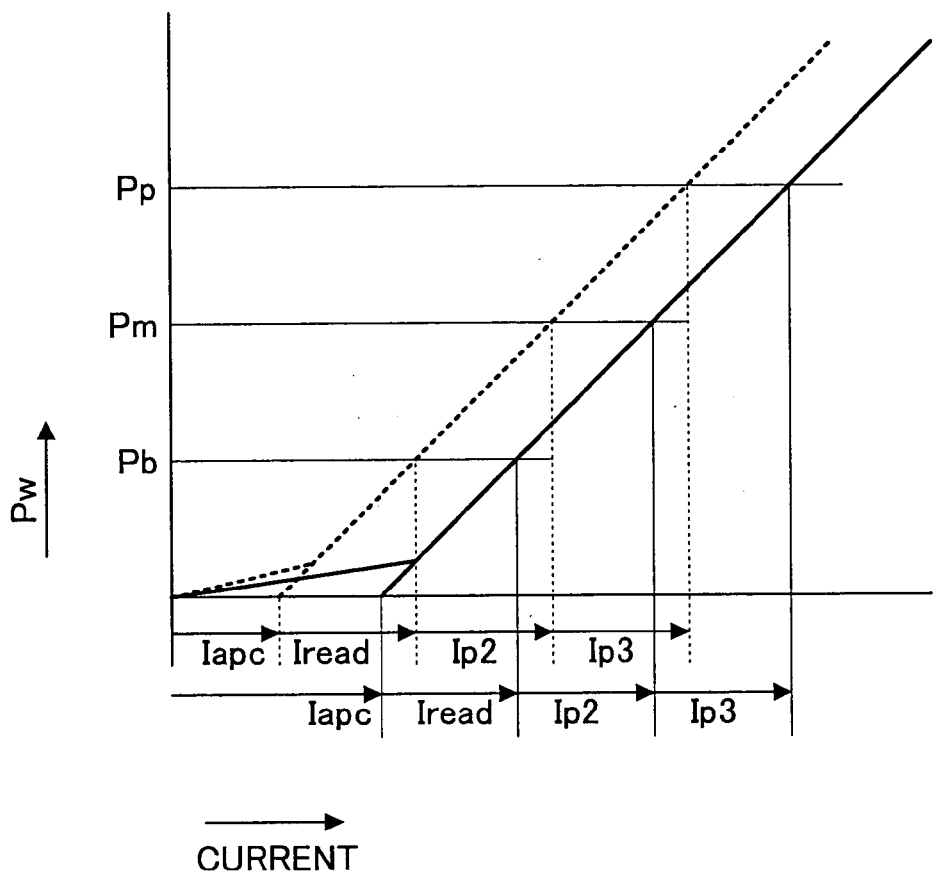
FIG. 6 is a graph showing the variation of driving current at the time when an LD begins emission.

FIG. 6 shows the case where the current until the LD 2 becomes luminous varies due to environmental variation. Since Pm and Pav are thus varied, Iapc is increased/decreased (controlled) in accordance with the variation of Pm. In this case, since the differential efficiency does not change, if Pm is made stable, Pav is close to the target value. Thus, Pav is not corrected.

Figure 7A:
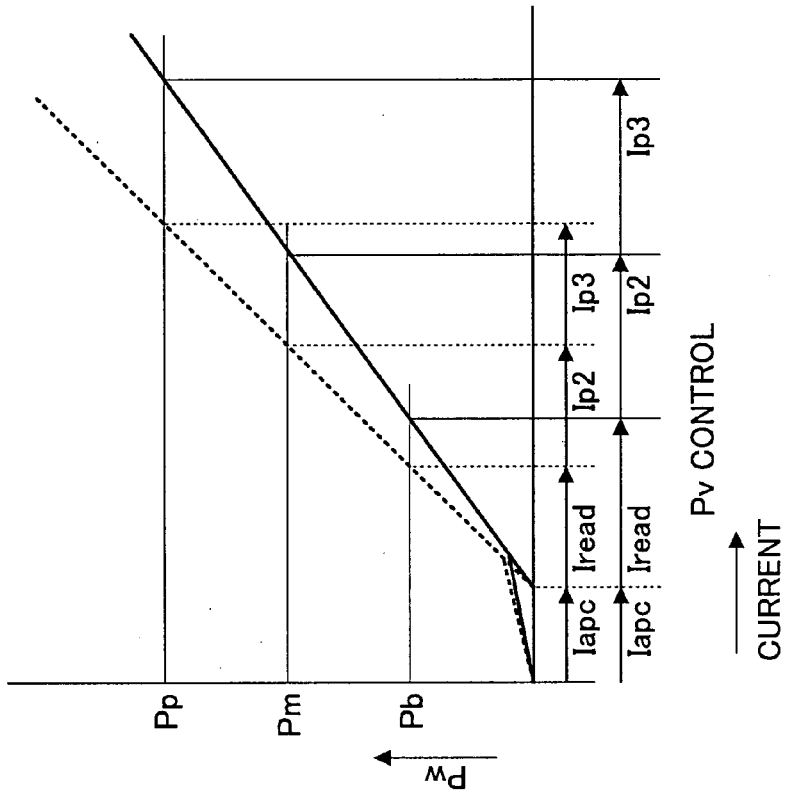
FIGS. 7A and 7B are graphs showing variation of differential efficiency of the LD in accordance with environmental change.
Figure 7B:
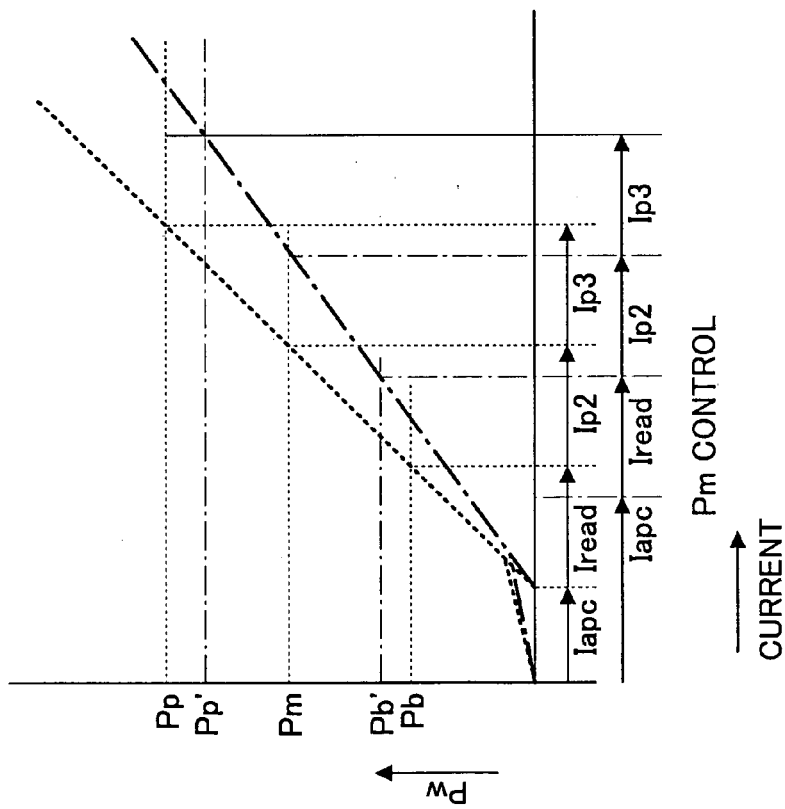

In addition, FIGS. 7A and 7B show cases where the differential efficiency varies. At first, since Pm is thus shifted, Iapc is increased/decreased (controlled) such that Pm becomes the target value. Hence, Pm becomes close to the target value, and Pm is made stable. Iread, Ip2, and Ip3 on this occasion are the current amounts at the conventional differential efficiencies. Thus, they are different from the expected values. Then, the target value obtained through calculation is compared with Pav obtained by sampling so as to increase/decrease Iread, Ip2, and Ip3. Further, Iread (and Ip2 and Ip3) are increased/decreased after Pm is made stable, so that Pav becomes the target value.

The power obtained from Iread in the above state is identical with the target value of the read power at the time. Hence, it is possible to make the convergence time in the above-described control process shorter by calculating the differential efficiency from the read power and Iread, and calculating the initial value of the control in power setting of the next time.

According to the present invention, when recording is performed under the condition that the erase power in recording spaces is controlled, it is possible to correct the peak power, with respect to the bottom power, to equal the optimum write power.

Also, according to the present invention, even if the ratio becomes a singular solution, it is possible to set the peak power, erase power and bottom power to the desired values.

In addition, according to the present invention, it is possible to stabilize the system since transitional variation in controlling the erase power is not responded to.

Further, according to the present invention, it is always possible to obtain the newest (most recent) efficiency with respect to differential efficiency varying in response to environmental change. Hence, it is possible to shorten the convergence time from recording power setting.

It should be noted that the central processor 4 functions as target value setting means, comparing means, and controlling means.

The present invention is not limited to the specifically disclosed embodiments, and variations and modifications may be made without departing from the scope of the present invention.

The present application is based on Japanese priority application No. 2002-270823 filed on Sep. 17, 2002, the entire contents of which are hereby incorporated by reference.

What is claimed is:

1. A write power control method of controlling a recording pulse of a laser diode, comprising the steps of:

setting, to a target value, a measured value corresponding to an optimum write power determined in an optimum write power determining process performed before recording information;

comparing the target value with an output level measured in power control; and controlling an erase power to approach the target value based on a result of the comparison, wherein:

the recording pulse is a multi-pulse defined by a peak power, the erase power, and a bottom power, the erase power is used in the step of controlling the erase power at a time when the multi-pulse is not being output, wherein, when the erase power falls within a permissible range of the target value in the step of controlling the erase power, in a case where an average value measured in recording information is greater than the target value measured in the optimum write power determining process, it is possible to perform correction of increasing a first additional value and a second additional value, in a case where the average value is smaller than the target value, it is possible to decrease the first and second additional values, and the first additional value being added to the erase power to obtain the peak power, and the second additional value being added to the bottom power to obtain the erase power.

2. A write power control method of controlling a recording pulse of a laser diode, comprising the steps of:

setting, to a target value, a measured value corresponding to an optimum write power determined in an optimum write power determining process performed before recording information;

comparing the target value with an output level measured in power control; and controlling an erase power to approach the target value based on a result of the comparison, wherein:

the recording pulse is a multi-pulse defined by a peak power, the erase power, and a bottom power, and the erase power is used in the step of controlling the erase power at a time when the multi-pulse is not being output, a ratio of the multi-pulse is varied for sampling an average value when the average value is close to the erase power, the average value is obtained based on the peak power, the bottom power, and a strategy, when the erase power falls within a permissible range of the target value in the step of controlling the erase power, in a case where an average value measured in recording information is grater than the target value measured in the optimum write power determining process, it is possible to perform correction of increasing a first additional value and a second additional value, in a case where the average value is smaller than the target value, it is possible to decrease the first and second additional values, and the first additional value being added to the erase power to obtain the peak power, and the second additional value being added to the bottom power to obtain the erase power.

3. The write power control method as claimed in claim 2, wherein an amount added to the bottom power to obtain the erase power, at the time when a difference between the target value measured in the optimum write power determining process and the average value measured in recording information falls within a permissible range, is maintained, efficiency (differential efficiency) of power to a current supplied to the laser diode is obtained, and the efficiency is set to an initial value in setting write power for the next time.

* * * * *